United States Patent
Schöller et al.

[11] Patent Number: 5,938,051
[45] Date of Patent: Aug. 17, 1999

[54] STACKING COLUMN FOR STORING ARTICLES

[75] Inventors: Heinz Schöller, Rielasingen-Worblingen; Gustav Strobel, Saulgau, both of Germany

[73] Assignee: mts Maschinen GmbH, Mengen, Germany

[21] Appl. No.: 08/972,112

[22] Filed: Nov. 17, 1997

[30] Foreign Application Priority Data

Nov. 18, 1996 [DE] Germany ............................ 196 47 578

[51] Int. Cl.⁶ ...................................................... A47F 5/00
[52] U.S. Cl. ...................... 211/150; 211/41.1; 211/59.4
[58] Field of Search ................................... 211/150, 149, 211/59.4, 41.1, 13.1

[56] References Cited

U.S. PATENT DOCUMENTS

| | | | |
|---|---|---|---|
| 4,359,162 | 11/1982 | Mayer et al. ....................... | 211/41.1 X |
| 4,572,382 | 2/1986 | Niederprum ........................... | 211/150 |
| 4,712,691 | 12/1987 | Grill et al. ........................... | 211/150 X |
| 5,005,712 | 4/1991 | Niederprum ........................... | 211/150 |
| 5,301,824 | 4/1994 | Schoeller ............................... | 211/150 |

FOREIGN PATENT DOCUMENTS

| | | | |
|---|---|---|---|
| 0510405 | 10/1992 | European Pat. Off. ............... | 211/150 |
| 0212528 | 12/1983 | Japan ..................................... | 211/150 |

*Primary Examiner*—Robert W. Gibson, Jr.
*Attorney, Agent, or Firm*—Bachman & LaPointe, P.C.

[57] ABSTRACT

In the case of a stacking column for storing articles, in particular vehicle-body parts, on carrying arms (3) of ratchet levers (2) which pivot around a pivot pin (6) from a rest position into an operating position, it is the intention for a plurality of ratchet levers (2.1–2.6) to be arranged one above the other or one beside the other and to be in operative connection. In this case, an intermediate ratchet element (14.1–14.5) is provided between two adjacent ratchet levers (2.1–2.6) and, once the article has been placed in position on or against one ratchet lever (2.2), can itself be placed in position, by virtue of the pivot movement of the other ratchet lever (2.3), on or against the article on the other side of the one ratchet lever (2.2).

6 Claims, 2 Drawing Sheets

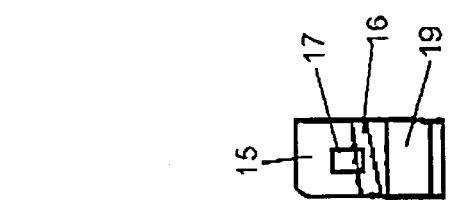
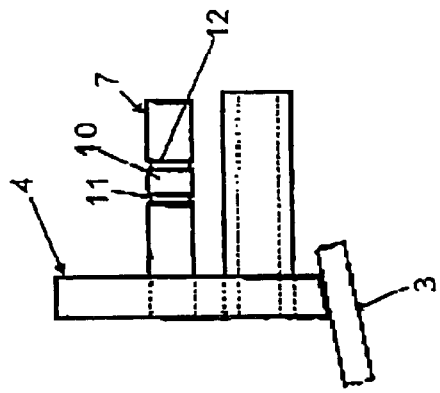
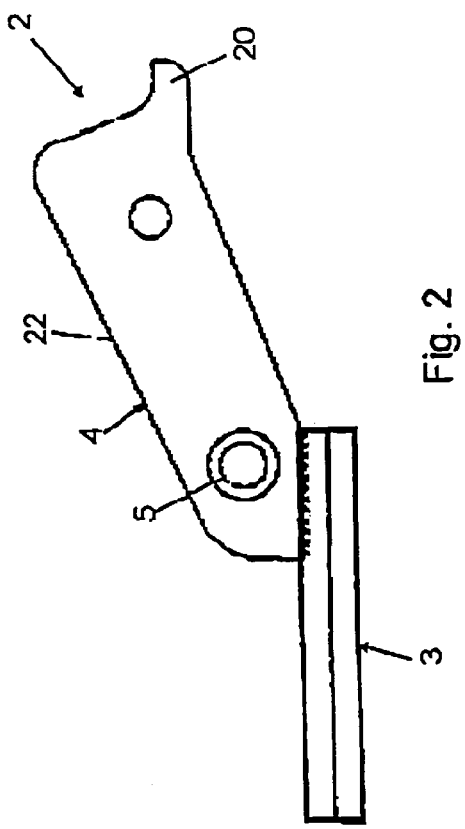
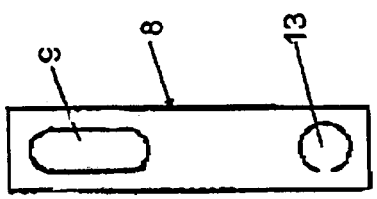
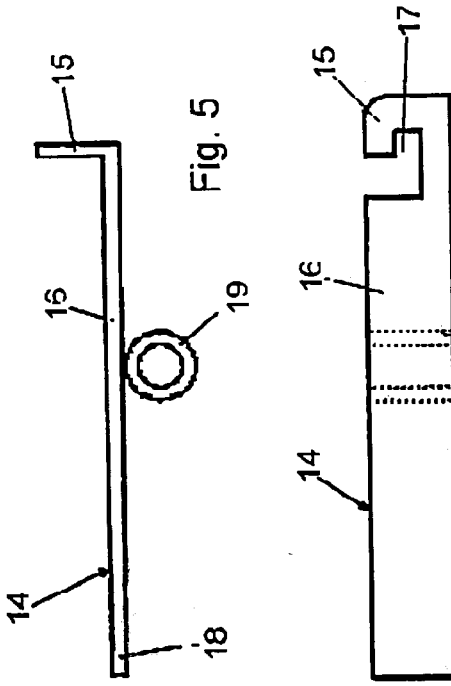

STACKING COLUMN FOR STORING ARTICLES

BACKGROUND OF THE INVENTION

The invention relates to a stacking column for storing articles, in particular vehicle-body parts, on carrying arms of ratchet levers which pivot around a pivot pin from a rest position into an operating position, a plurality of ratchet levers being arranged one above the other or one beside the other and being in operative connection.

Such stacking columns are known in a wide variety of shapes and designs. They are usually vertical stacking columns which are arranged in a square. Such stacking columns are disclosed, for example, in German Patent 36 36 251 and also in DE-A 38 11 310.

For certain reasons, it may also prove to be advisable to arrange these stacking columns obliquely, as is disclosed in DE-A 41 33 464. It is also possible to arrange the stacking columns horizontally, as in DE-A 40 20 864.

Preferably, these stacking columns are also enclosed by a protective profile, as is described in more detail in EP-A-93 10 42 23.

In the case of all these stacking columns, the articles rest in or on the carrying arms of the ratchet levers, and there is a risk of the articles being displaced. In particular if the stacking columns are designed to be transportable, this disadvantage has a considerable adverse effect. Displacement on the carrying arms may additionally result in damage to the articles. As a result there has been a changeover, at the present time, to securing the articles in the stacking columns by additional means as well. Up until now, use has been made of all possible, complex clamps and other securing means, which result in considerable additional outlay.

SUMMARY OF THE INVENTION

The object of the invention is to develop a stacking column of the above-mentioned type in which, even when they are introduced normally into the stacking column, the articles are retained securely.

This object is achieved in that an intermediate ratchet element is provided between two adjacent ratchet levers and, once the article has been placed in position on or against one ratchet lever, can itself be placed in position, by virtue of the pivot movement of the other ratchet lever, on or against the article on the other side of the one ratchet lever.

In the case of some of the known stacking columns, the ratchet levers move in dependence on one another. Usually, the ratchet levers move from a rest position into a standby position and, from there, into an operating position. If a ratchet lever is pivoted into an operating position in each case, i.e. an article is placed in position on it, then it moves the following ratchet lever into a standby position.

If an article is then placed in position on this ratchet lever which is located in standby position, then this lever pivots the following ratchet lever into the standby position. In the present exemplary embodiment, this takes place by the interaction of a top control edge of a control arm of the ratchet lever, on which a bolt of the following ratchet lever slides. If the control edge of the ratchet lever which is located in the standby position is pivoted into the operating position, it is configured such that the bolt of the following ratchet lever slides along it and thus moves the following ratchet lever into the standby position.

The present invention, then, utilizes the basic idea of the interaction of the ratchet levers for the intermediate ratchet elements as well. The pivot movement of the intermediate ratchet elements is coordinated such that it follows the pivot movement of the ratchet levers to a desired extent. This means that an intermediate ratchet element should still be in the rest position when the ratchet lever assigned to it is already located in the standby position. Furthermore, the intermediate ratchet element should still be in the standby position when the ratchet lever assigned to it is already in the operating position. It is only when the following ratchet lever moves into the operating position that, in a preferred exemplary embodiment, the intermediate ratchet element should be closed, i.e. placed in position on or against the article.

The intermediate ratchet element should thus likewise be arranged pivotably on the stacking column, it being the case that, in a preferred exemplary embodiment, the intermediate ratchet element likewise uses the pivot pin of the ratchet lever. This allows favorable coordination of the pivot movements.

The manner in which the intermediate ratchet element is configured depends, as does the configuration of the carrying arm and that of the ratchet lever, on the article which is to be stored. In most cases, however, it is likely to be configured in the form of a strip, with the result that it has one end each on either side of the pivot pin. The intermediate ratchet element presses on the article with one end, and the other end is preferably connected in an articulated manner to the control arm of the following ratchet lever via a connecting strip. It is sufficient here if the end of the intermediate ratchet element has a hook or the like by means of which the intermediate ratchet element is fitted into a cutout in the connecting strip.

On the other side from the cutout, the connecting strip has a further cutout, which is preferably configured as a slot. A bolt of the control arm of the following ratchet lever engages in this slot, with the result that, when said ratchet lever is pivoted, the intermediate ratchet element is moved as well.

The above-mentioned bolt, via which the ratchet lever is already moved from a rest position into a standby position, is preferably used as the bolt for connection to the connecting strip. As a result, the individual parts which allow the ratchet lever and intermediate ratchet element to move are reduced to a minimum.

In addition, the connecting strip is fastened on the bolt such that the latter can slide in the above-mentioned slot. Appropriate securing rings, which are accommodated as spring rings in grooves of the bolt, are suitable for this purpose.

BRIEF DESCRIPTION OF THE DRAWINGS

Further advantages, features and details of the invention can be gathered from the following description of preferred exemplary embodiments and with reference to the drawing, in which:

FIG. 2 shows a side view of a ratchet lever for retaining articles;

FIG. 3 shows an end view of the ratchet lever according to FIG. 2;

FIG. 4 shows a plan view of a connecting strip;

FIG. 5 shows a side view of an intermediate ratchet element according to the invention;

FIG. 6 shows a plan view of the intermediate ratchet element according to FIG. 5 before a hook has been bent at an angle; and FIG. 7 shows an end view of the intermediate ratchet element according to FIGS. 5 and 6.

DETAILED DESCRIPTION

Figure 1:
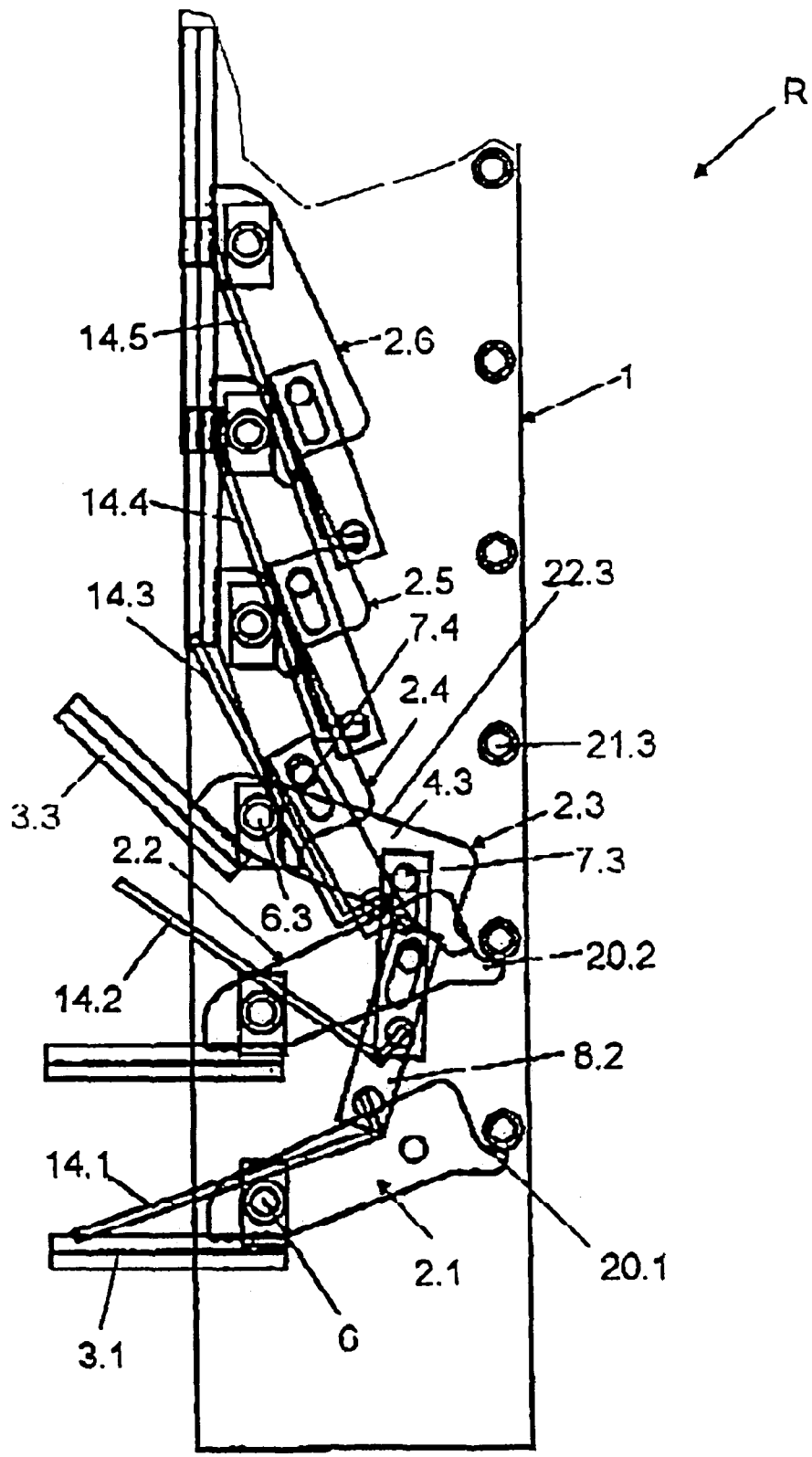
FIG. 1 shows a detail of an opened stacking column.

A stacking column R has two strip-like walls which are parallel to one another and have a distance between them. FIG. 1 only shows the rear strip-like wall 1 of the column; the front strip-like wall has been removed.

Positioned between the two strip-like walls of the column are ratchet levers 2.1 to 2.6, one ratchet lever 2 being illustrated in more detail in FIGS. 2 and 3. Each ratchet lever 2 has a carrying arm 3 and a control arm 4. In the present exemplary embodiment, the carrying arm 3 is arranged obliquely with respect to the control arm 4, but other configurations of the carrying arm 3 which fulfil the requirements of the article which is to be stored are also conceivable.

A sleeve 5 is located on the control arm 4 in the vicinity of the carrying arm 3 and, in the use position according to FIG. 1, has a pivot pin 6 inserted through it. The entire pivot lever 2 pivots around this pivot pin 6.

A bolt 7 is provided on the control arm 4, on the far side of the sleeve 5, and has two functions, which are described below. In one function, the bolt 7 serves for retaining a connecting strip 8, which is shown in FIG. 4, the bolt 7 passing through a slot 9 in the connecting strip 8. In the use position, the slot 9, or the connecting strip 8, is located on a central piece 10 of the bolt 7, between two annular grooves 11 and 12, and is retained on this central piece 10 by spring rings (not shown specifically) which are positioned in the annular grooves 11 and 12.

On the other side of the slot 9, the connecting strip 8 has a further cutout 13, into which an intermediate ratchet element 14, which is illustrated in FIGS. 5 to 7, can be fitted. For this purpose, the intermediate ratchet element 14 has an integral hook 15, which is still in the same plane as a ratchet strip 16 in FIG. 6, but has already been moved into the upright position in FIG. 5. This hook 15 forms a U-shaped hook opening 17 into which the connecting strip 8 is fitted, the hook 15 engaging through the cutout 13.

A further sleeve 19 is arranged, beneath the ratchet strip 16, between the hook 15 and a pressure-exerting end 18 and is likewise positioned on the pivot pin 6. As a result, it is also possible for the intermediate ratchet element 14 to pivot around this pivot pin 6.

The present invention functions as follows:

According to FIG. 1, the ratchet lever 2.1 is located in the operating position, the intermediate ratchet element 14.1 assigned to it also being in the closed position already.

The ratchet lever 2.2 arranged above is likewise located in the operating position, but the intermediate ratchet element 14.2 assigned to it is still open, i.e. in the standby position.

The ratchet lever 2.3 arranged above is located in the standby position, and the intermediate ratchet element 14.3 assigned to it is in the rest position.

The ratchet levers 2.4 to 2.6, together with the intermediate ratchet elements 14.4 and 14.5 assigned to them, are located in the rest position.

The ratchet levers and the intermediate ratchet elements move in dependence on one another. At the current point in time, the ratchet lever 2.3 is located in the standby position for receiving an article which is to be stored. If this article is introduced between preferably four stacking columns arranged in a rectangle, then it presses on the carrying arm 3.3 of the ratchet lever 2.3. This results in said ratchet lever 2.3 pivoting around the pivot pin 6.3 until its control arm 4.3 strikes against a stop 21.3 by means of a nose 20 (not shown in any more detail). This carrying position is illustrated for the ratchet levers 2.1 and 2.2.

During this pivoting around the pivot pin 6.3, the ratchet lever 2.3 has fulfilled two functions. On the one hand, a top control edge 22.3 of the control arm 4.3 presses on the bolt 7.4 of the following ratchet lever 2.4, with the result that said bolt slides along the top control edge 22 and is then located in a position such as that indicated for the bolt 7.3 of the ratchet lever 2.3. As a result, the ratchet lever 2.4 is pivoted into the standby position.

Also located on the bolt 7.4 is the connecting strip 8.3 to the intermediate ratchet element 14.3, which likewise pivots around the pivot pin 6.3. By virtue of the movement of the bolt 7.4, said intermediate ratchet element 14.3 moves into the standby position, as is shown for the intermediate ratchet element 14.2.

In turn, the intermediate ratchet element 14.2, which is connected to the bolt 7.3 of the ratchet lever 2.3 via the connecting strip 8.2, moves, by virtue of the pivoting thereof, into an operating position, as is indicated for the intermediate ratchet element 14.1. In this operating position, the intermediate ratchet element 14.1 and the carrying arm 3.1 receive an article (not shown specifically) between them and retain said article.

For removal of the articles, the operation of moving the ratchet levers and the intermediate ratchet elements takes place in correspondingly reverse order. In this case, the slot 9 in the connecting strips 8 ensures that the preceding ratchet lever can fully execute a movement at least into the standby position without the intermediate ratchet element beneath being raised up from the article.

We claim:

1. A stacking column for storing articles comprising:

a pair of parallel spaced apart walls;

at least two pivot pins extending between said spaced apart walls, said at least two pivot pins being spaced apart from one another one above the other;

a first ratchet lever located on a first pin of said at least two pivot pins and a second ratchet lever located on a second of said at least two pivot pins wherein said first ratchet lever is below said second ratchet lever;

a first intermediate ratchet element pivotably located on a pin, said first intermediate ratchet element having a first end which contacts said first ratchet lever when said first ratchet lever is in an operating position and a second end provided with connecting means for connecting to said second ratchet lever above said first ratchet lever whereby movement of said first ratchet lever to said operating position moves said second ratchet lever to a standby position wherein a second intermediate ratchet element pivotally located on said second pin has a first end spaced from said second intermediate ratchet element.

2. A stacking column according to claim 1, wherein said first and second ratchet levers each comprise a carrying arm connected to a control arm, each control arm having a projection provided thereon wherein said connecting means of said first intermediate ratchet element is connected to said projection on said control arm of said second ratchet lever.

3. A stacking column according to claim 1, wherein said connecting means is fitted on one end into a hook on the second end of the intermediate ratchet element.

4. A stacking column according to claim 3, wherein an other end of the connecting means has a slot in which the projection on the control arm of the second ratchet lever slides.

5. A stacking column according to claim 4, wherein the connection means is secured releasably on the projection by securing rings.

6. A stacking column according to claim 1, wherein said first intermediate ratchet element is pivotably located on said first pin.

* * * * *